United States Patent [19]

Ravenberg et al.

[11] Patent Number: 5,503,427
[45] Date of Patent: Apr. 2, 1996

[54] ENERGY ABSORPTION COVER FOR PASSENGER-SIDE AIRBAG MODULE

[75] Inventors: Michael J. Ravenberg, Corinne; Larry D. Rose, Layton, both of Utah; Russell S. Gans, Westland, Mich.; Stewart L. Richards, South Weber, Utah; Patrick G. Jarboe, Shelby Township, Mich.; Mark Rogers, Roy, Utah

[73] Assignee: Morton International, Inc., Chicago, Ill.

[21] Appl. No.: 413,238

[22] Filed: Mar. 30, 1995

[51] Int. Cl.⁶ .................................................. B60R 21/16
[52] U.S. Cl. ........................................ 280/728.3; 280/732
[58] Field of Search ............................... 280/728.3, 732, 280/751, 752

[56] References Cited

U.S. PATENT DOCUMENTS

| | | | |
|---|---|---|---|
| 5,316,334 | 5/1994 | Skidmore | 280/728.3 |
| 5,395,133 | 3/1995 | Lauritzen et al. | 280/728.3 |
| 5,419,583 | 5/1995 | Sakakida et al. | 280/728.3 |

Primary Examiner—Kenneth R. Rice
Attorney, Agent, or Firm—George W. Rauchfuss, Jr.; Gerald K. White

[57] ABSTRACT

The cover of a passenger-side airbag module is provided with an energy absorption zone to protect the passenger during head impact. The zone is in the form of corrugations which extend across the mouth of the airbag module. The corrugations crush upon impact, thereby absorbing energy.

20 Claims, 3 Drawing Sheets

ENERGY ABSORPTION COVER FOR PASSENGER-SIDE AIRBAG MODULE

TECHNICAL FIELD

This invention relates to motor vehicle passenger-side airbag modules. More particularly, it relates to an instrument panel door for such a module designed to absorb energy from an occupant impact.

BACKGROUND ART

Passenger-side airbag modules are normally installed behind the instrument panel of motor vehicles. (As used herein, the term "instrument panel" refers to the extended dashboard faced by the motor vehicle passenger and need not include instruments.) The module normally includes a housing for a reaction canister containing a folded airbag and means for inflating the airbag in response to a collision of sufficient severity. This module is installed behind the dashboard. The dashboard itself is provided with some type of door to permit the inflating airbag into the passenger compartment.

Since the airbag module is, of necessity, very close to the instrument panel, it presents a problem in the case of impacts or collisions below the severity required to actuate the airbag. The instrument panel is normally soft and flexible, but the airbag module is metal or a hard plastic. Accordingly, in the event of a collision less severe than that required to actuate the airbag, an occupant may be injured by impact with the housing through the instrument panel. In fact, this presents enough of a problem to result in a "Standard No. 201" by the National Highway Traffic Safety Administration of the Department of Transportation. 49 CFR chapter V, §571.201 provides, in pertinent part "Instrument panels. . . . when that area of the instrument panel that is within the head impact area is impacted . . . by a 15-pound, 6.5-inch diameter head form at a relative velocity of 12 miles per hour, the deceleration of the head form shall not exceed 80 g continuously for more than 3 milliseconds."

The reason for establishing this standard was to protect the vehicle occupant during crashes occurring below the threshold speed required to deploy the airbag system. Even at these low speeds, head injuries may occur on impact with a dashboard which is too rigid.

In the past this problem has been met by weakening the airbag housing so that it crushes under impact. An example of such an approach will be found in co-pending U.S. patent application Ser. No. 08/392,531 of Jon E. Miles, Scott L. Hansen, and John T. Jensen for COLLAPSIBLE AIRBAG CANISTER, filed Feb. 23, 1995 and assigned to the same assignee as the present invention. While such an approach has been successful, it is often desirable to have a rigid airbag housing to insure that the airbag is restrained and deploys correctly.

Accordingly, it is a primary object of the present invention to provide an energy absorbing zone which is separate from the airbag housing. Other objects, features, and advantages will become apparent from the following description and appended claims.

DISCLOSURE OF INVENTION

In accordance with the present invention, a crushable corrugated sheet is interposed between the mouth of the airbag housing and the bag deployment door in the instrument panel. In one version the corrugated sheet is part of the door. In another version, the corrugated sheet is suspended between the door and the bag housing.

BEST MODE FOR CARRYING OUT THE INVENTION

Figure 1:
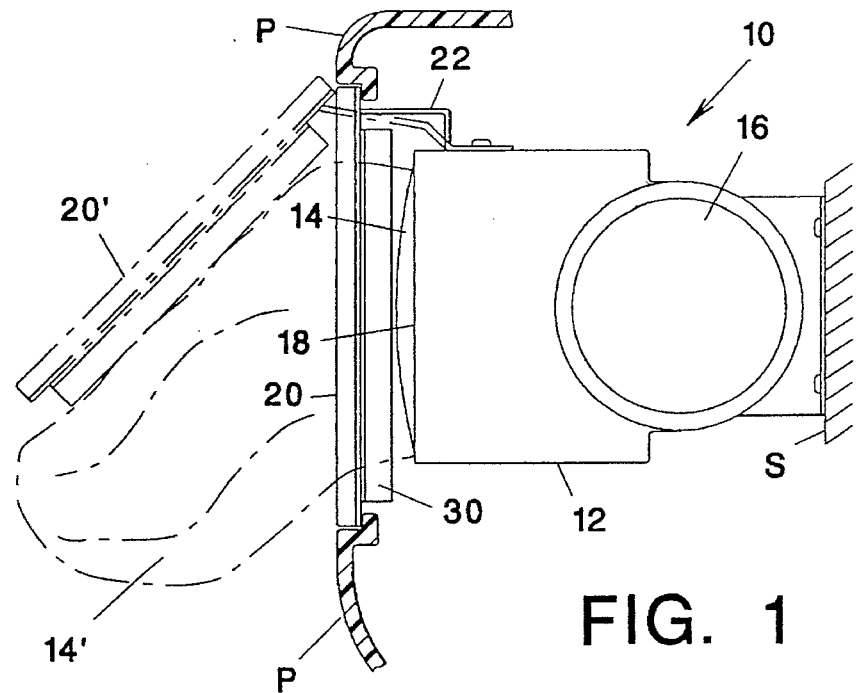
FIG. 1 is an elevational view of an airbag module in accordance with the present invention.
Figure 2:
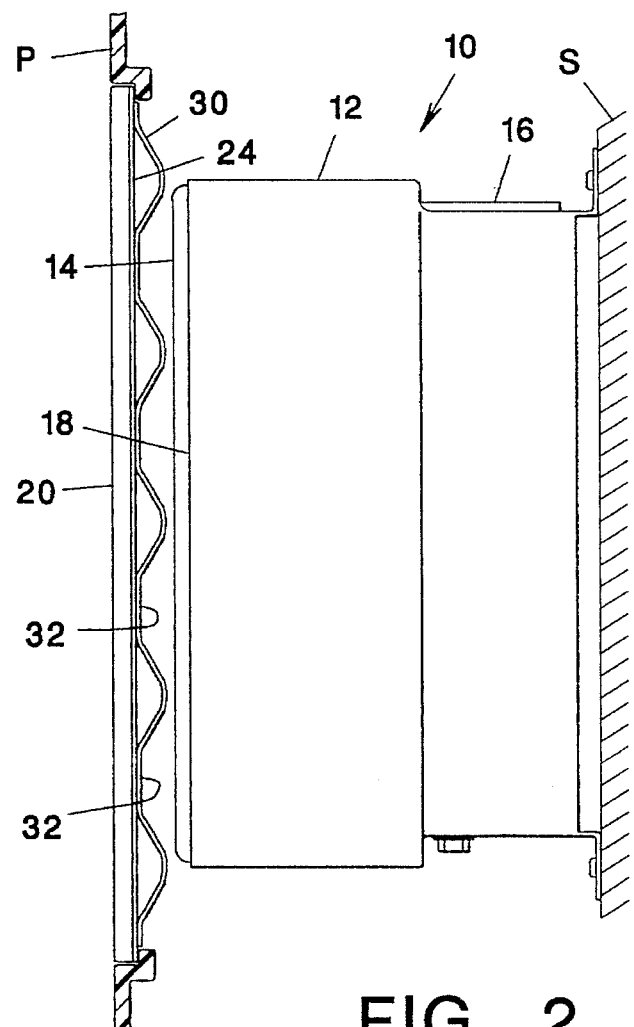
FIG. 2 is a bottom view of the module of FIG. 1.

Referring first to FIGS. 1 and 2, there is illustrated a passenger-side airbag module 10. The module 10 is mounted to the vehicle's structure S and behind the instrument panel P which is shown in cross-section. The airbag module 10 comprises a substantially rectangular housing 12 enclosing a folded airbag 14. The portion of the housing 12 to the right as viewed in FIGS. 1 and 2 is cylindrical and encloses a cylindrical inflator 16. These portions are conventional, well known to those skilled in the art, and need not be described in detail. The rectangular housing 12 may be of metal such as steel or extruded aluminum and its edges define an open rectangular mouth 18 positioned just behind the instrument panel P.

The instrument panel P includes an opening which is closed by a door 20. The door 20 is mounted to the housing 12 by a hanger 22. When the airbag 14 inflates, as illustrated by the dash-dotted lines 14' in FIG. 1, it pushes open the door 20', shown in its partially open position, while the hanger 22 straightens and serves as a retaining tether. As illustrated in more detail in FIG. 5, the door 20 is laminated, comprising a sheet steel substrate 24, a foam interior 26, and an outer skin 28 to add aesthetic features such as color, grain, trim, and contour lines.

Returning to FIGS. 1 and 2, a crushable impact zone is provided on the door 20 by a metal corrugated sheet 30. The sheet 30 is secured to the substrate 24 of the door 30 as by welding along the regions 32 intermediate the corrugations. In the embodiment shown, the corrugations are substantially parallel. However, they may be arranged in any suitable configuration. The corrugations are substantially triangular in cross section and are long enough to span the mouth 18 of the housing 12 as illustrated in FIG. 1. In one embodiment of this invention both the metal substrate 24 and the corrugated sheet 30 are of steel having thicknesses of about 0.5–2 mm. The triangular corrugations provide a "truss" effect which stiffens the door 20 and resists bending. This permits the use of thinner materials than would otherwise be required.

Figure 5:
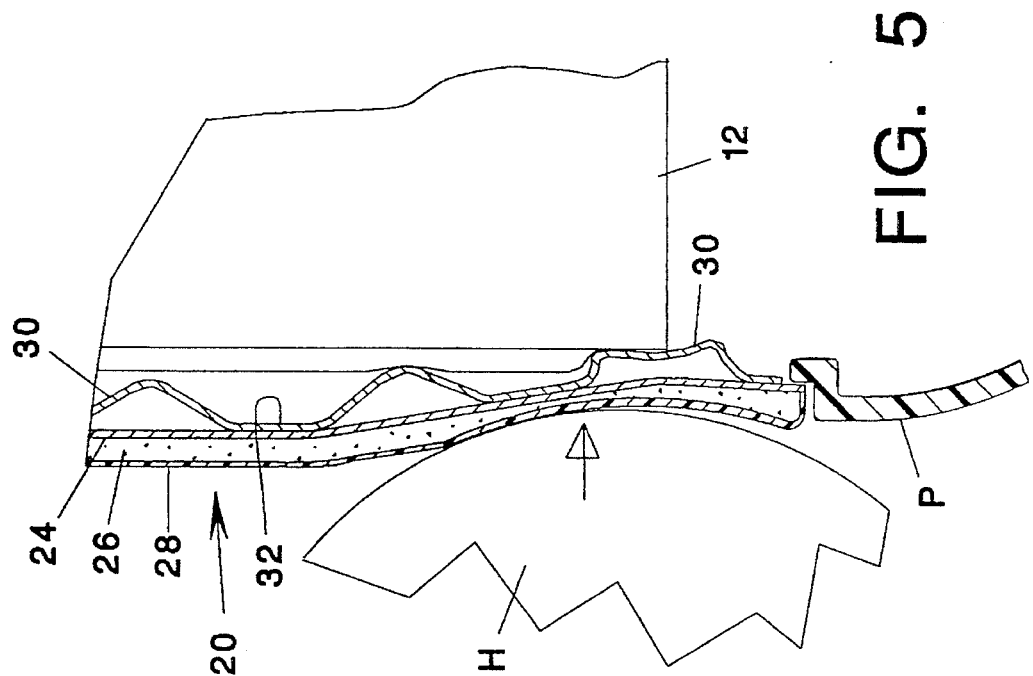
FIG. 5 is an enlarged detail illustrating the functioning of the FIG. 1 version.

FIG. 5 illustrates a body part such as a head H making impact with the door 20. In this illustration, the corrugations in the sheet 30 are shown crushing against the edges of the housing, collapsing, thereby dissipating energy and cushioning the impact of the head H against the housing 12.

Figure 3:
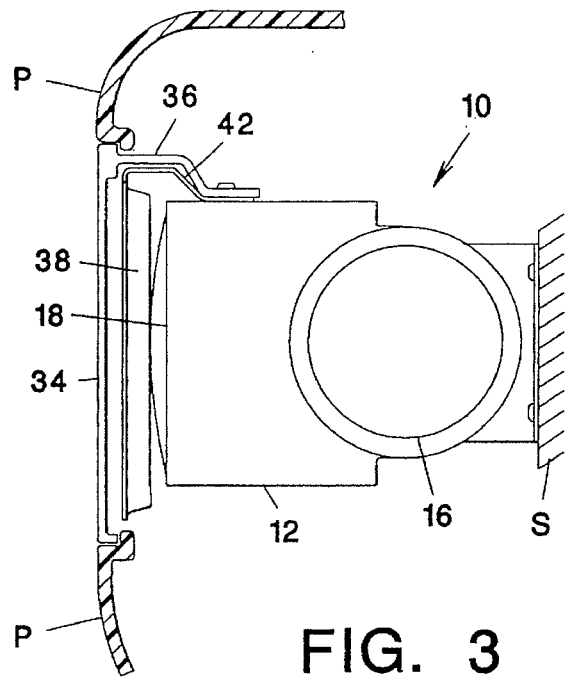
FIG. 3 is an elevational view of a modification of the invention.
Figure 4:
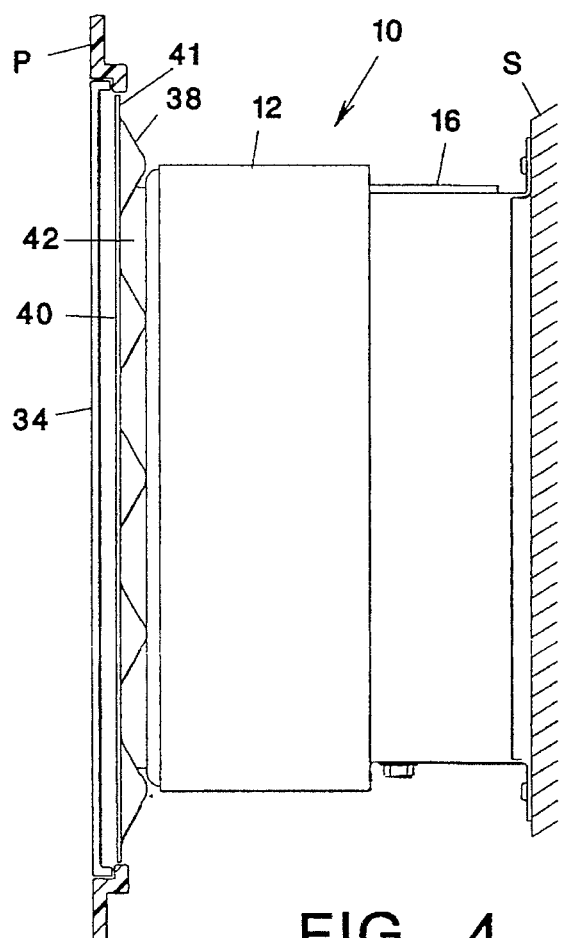
FIG. 4 is a bottom view of the modification of FIG. 3.
Figure 6:
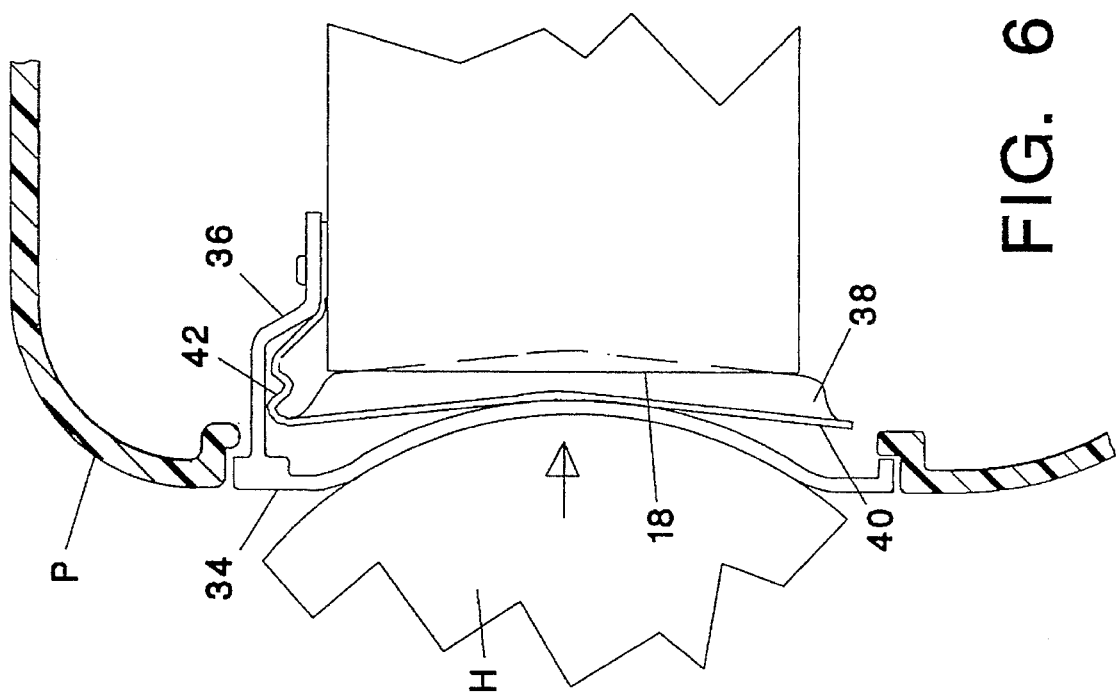
FIG. 6 illustrates the functioning of the FIG. 3 version of the invention.

The door structure illustrated in FIGS. 1, 2, and 5 would be used primarily in top-of-the-line and luxury cars, due to the expense of the laminated door 20. FIGS. 3, 4, and 6 illustrate a modification of the invention which permits the use of a cheaper, molded plastic, door. It is particularly useful when the worst case head impact location is in the center of the airbag module directly over the folded airbag. The airbag module itself is similar to that previously described and, accordingly, similar reference numerals are employed. In this modification, the door 34 is of one piece molded plastic and may be unitary with the hanger 36. However, an additional element is added in the form of a single sheet stamping 38 positioned intermediate, and spaced from, each of the door 34 and housing 18. The stamping 38 is of sheet steel as previously described and the corrugations are drawn from the main body 40, thereby leaving an encircling flange or peripheral stiffening rim 41 as illustrated in FIGS. 3 and 4. This flange may also have an integral bracket or hanger 42 which may be attached to the housing 12 at the same location as the hanger 36 for the door.

Under normal operation, both the door 34 and the stamping 38 are opened outwardly by the expanding airbag in the same fashion as illustrated in FIG. 1. Also, as illustrated in FIG. 3, the corrugations of the stamping 38 span the mouth 18 of the airbag housing 12 in the same manner as previously described. As a result, the stamping 38 provides a bridge across the open mouth 18. As illustrated in FIG. 6, the impact of a head H against the door 34 pushes inwardly against the stamping 38 which bends into the mouth 18, thereby absorbing energy.

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

We claim:

1. In a motor vehicle passenger side restraint module of the type including a housing mounted behind the instrument panel of the vehicle having edges defining an open mouth closely adjacent said panel, an airbag stowed within said housing, means for inflating said airbag upon the occurrence of a collision of preselected magnitude, and a door in said instrument panel covering the open mouth of said housing and displaceable by the inflation of said airbag, the improvement comprising:

a relatively thin sheet mounted between said door and said housing defining a plurality of elongated corrugations spanning the open mouth of said housing and crushable against the edges of said housing to absorb energy and protect an occupant upon impact with said door.

2. The improvement of claim 1 wherein said corrugations are substantially parallel and said sheet is attached to said door along attachment regions intermediate said corrugations.

3. The improvement of claim 2 wherein said corrugations are substantially triangular in cross section.

4. The improvement of claim 2 wherein said door comprises a sheet metal substrate forming a rear surface facing said housing and a decorative surface forming a portion of said instrument panel and wherein said corrugated sheet is attached to said substrate.

5. The improvement of claim 4 additionally comprising a compressible layer intermediate said rear surface and decorative surface.

6. The improvement of claim 4 wherein said corrugated sheet is metal.

7. The improvement of claim 6 wherein said corrugations are substantially triangular in cross section.

8. The improvement of claim 1 wherein the corrugated sheet is positioned intermediate, and spaced from each of, said door and said housing.

9. The improvement of claim 8 wherein said corrugations are substantially parallel.

10. The improvement of claim 9 wherein said corrugations are substantially triangular in cross section.

11. The improvement of claim 9 additionally comprising means for supporting said corrugated sheet on said housing.

12. The improvement of claim 9 wherein said corrugated sheet is formed sheet metal having a peripheral stiffening rim.

13. The improvement of claim 12 wherein said corrugations are substantially triangular in cross section.

14. The improvement of claim 13 additionally comprising means for supporting said corrugated sheet on said housing.

15. The improvement of claim 14 wherein said supporting means is a bracket.

16. A door mountable in an opening in an automotive instrument panel over the open mouth of an airbag housing comprising:

a sheet metal substrate having a rear surface adapted to face said housing and a front surface;

a decorative coating on the front surface of said substrate adapted to close said opening and form a continuation of said instrument panel; and a corrugated sheet mounted on the rear surface of said substrate having corrugations positioned to span the open mouth of said airbag housing and crushable against the edges of said housing to absorb energy and protect an occupant upon impact with said door.

17. The door of claim 16 wherein said corrugations are substantially parallel and said sheet is mounted to said substrate along attachment regions intermediate said corrugations.

18. The door of claim 17 wherein said corrugations are substantially triangular in cross section.

19. The door of claim 17 wherein said sheet is metal.

20. The door of claim 19 wherein said corrugations are substantially triangular in cross section.

* * * * *